June 20, 1950 S. S. BROWN 2,512,136
EXPLOSION-PROOF MOTOR
Filed Jan. 4, 1949 2 Sheets-Sheet 1
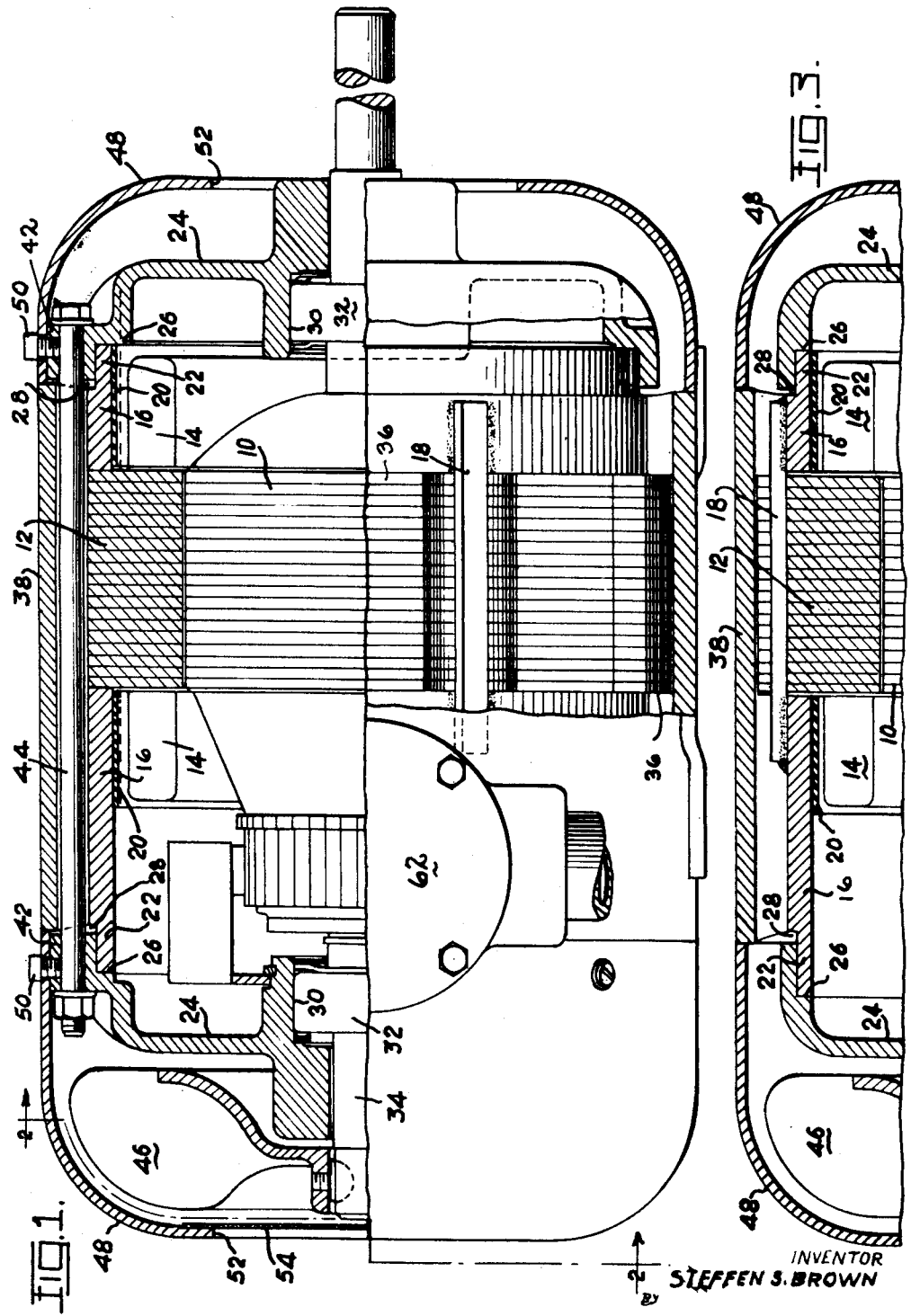
INVENTOR
STEFFEN S. BROWN
By Toulmin & Toulmin
ATTORNEYS

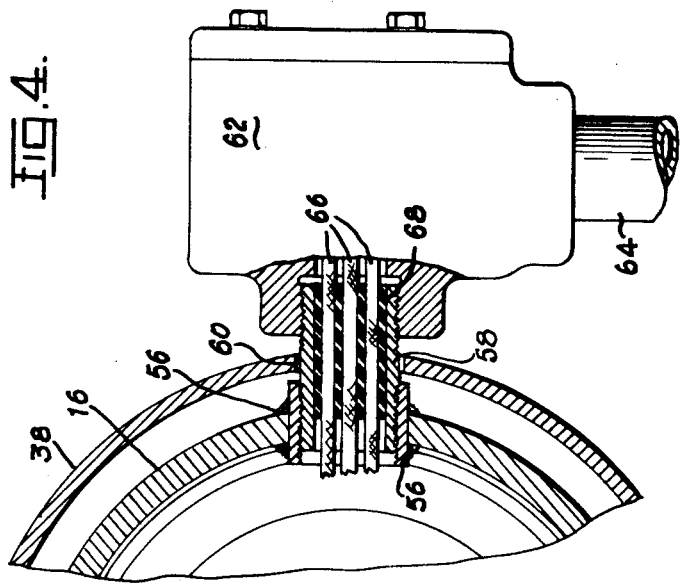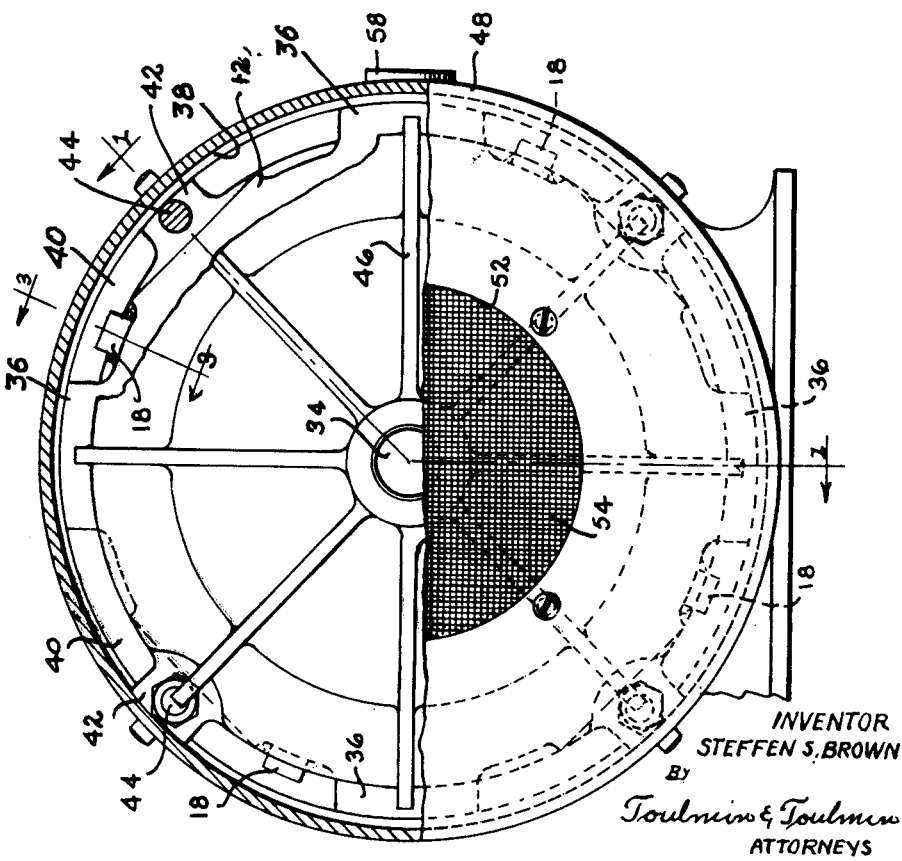

Patented June 20, 1950

2,512,136

UNITED STATES PATENT OFFICE 2,512,136

EXPLOSION-PROOF MOTOR

Steffen S. Brown, Dayton, Ohio, assignor to The Brown-Brockmeyer Co., Dayton, Ohio, a corporation of Ohio Application January 4, 1949, Serial No. 69,119

5 Claims. (Cl. 172—36)

This invention relates to rotary electrical apparatus such as electric motors, and particularly to an improved motor construction especially adapted for, but not necessarily limited to, vapor-proof or explosion-proof motors.

Explosion-proof or vapor-proof motors are provided for hazardous installations where there are corrosive or explosive vapors in the surrounding atmosphere. Such motors have their internal parts completely encased in an enclosure which is tight enough that the amount of vapors that may be drawn into the motor are not sufficient to sustain an explosion or any corrosion of the motor parts. When such motors are used for intermittent or light service, they may be cooled by means of a fan within the motor structure which causes the air to circulate therein so that the heat generated by the motor is passed off through the motor frame and end covers.

However, when a motor of this type is employed for relatively heavy or for continuous service, this type of cooling is not sufficient to maintain the motor within the allowable temperature rise. When greater cooling of the motors is desired, there is provided an external fan and air passages which are external of the motor proper, so that cooling air may be blown over and around the motor for maintaining its temperature between allowable limits. This type of construction usually yields a rather large motor and one which is not as pleasing in appearance as the ordinary type of motor which is cooled by passing air therethrough. Furthermore, due to the bulk of the motor and the rather large diameter thereof, it is sometimes difficult to obtain proper support for the bearings for the rotor of the motor, and the operating efficiency of the unit is thereby lessened. Also, such constructions are usually expensive and involve considerable extra machining and assembly work in arriving at the finished product.

The primary object of the instant invention is to provide an improved construction for vapor-proof or explosion-proof motors which is more economical than constructions of the prior art and which leads to a motor having improved operating characteristics.

It is another object of this invention to provide for a construction for explosion-proof or vapor-proof motors in which the resulting product has substantially the same configuration as the usual type motor and is, therefore, more pleasing in appearance.

Still another object of this invention is the provision of a type of construction for totally enclosed motors in which the rotor of the motor is rigidly supported thereby reducing the inefficiency usually attendant to this type of motor construction.

In the class of enclosed motors is the type known as "totally enclosed" and which is similar in construction to vapor-proof or explosion-proof motors, but which does not require the high degree of sealing of the motor interior. Totally enclosed motors are used where there is dust, grit or moisture in the air, and it will be understood that this invention applies equally well to the entire class of enclosed motors, including totally enclosed, vapor-proof and explosion-proof motors. Further, the term motor as used herein is intended to mean generator as well as motors or any other rotary electrical apparatus to which this invention applies.

These and other advantages of this invention will become more apparent upon reference to the following specification taken in connection with the accompanying drawings in which:

Figure 1 is a view partly in section and showing a motor constructed according to my invention. This view may be indicated by the line 1—1 on Figure 2, except that the lower half of Figure 1 is not fully in section, but has only the outer casing part thereof broken away;

Figure 2 is an end view partly in section as indicated by the line 2—2 on Figure 1 and with the end cover of the motor at the upper right-hand side of Figure 2 partly broken away;

Figure 3 is a fragmentary longitudinal section indicated by the line 3—3 on Figure 2; and Figure 4 is a fragmentary view showing details of the construction in connection with the terminal box for the motor.

Referring to the drawings somewhat more in detail, the construction of the motor proper will be best seen upon reference to Figures 1, 2, and 3. The motor comprises an armature or rotor, indicated at 10, which may include a commutator 11, and a stator, indicated at 12, having the windings 14. According to this invention, the stator laminations 12 are abutted on each side by a ring member 16 and these ring members are held in tight abutment with opposite sides of the stator iron by the bars 18 extending between and welded to the said rings. It may be here noted that the bars 18 are joined only to the end rings 16, and thus do not deleteriously affect the magnetic properties of the laminated stator iron.

In constructing the stator together with its rings, the stator laminations may first be stacked and riveted together or held together in alignment on a suitable fixture and thereafter the rings 16 are pressed against opposite sides of the stator and the bars 18 welded in place. Thereafter, the stator iron and the rings 16 form a solid integral unit and the individual laminations of the stator are securely held in proper alignment.

The stator windings may be placed thereon either prior to the mounting of the rings on the stator iron or thereafter, and there may be provided the sleeves of insulating material as at 20 as best seen in Figure 1 in order electrically to isolate the stator windings from the rings 16. It will be understood that the particular manner of applying the windings to the stator forms no part of the instant invention.

The outer end of each of the rings 16 has turned thereon a tenon as at 22 and telescopically received on these tenons are the end covers 24. The end covers 24 have shoulder grooves 26 turned therein which correspond in shape to the tenons 22 so that when the said end covers are placed over the ends of the rings 16 they form a close fit thereon. The lengths of the tenons 22 are longer than the axial part of the recesses 26 in the end covers so that there is a clearance as indicated at 28 in Figure 1. The purpose of this clearance is so that the outer ends of the tenons and the shoulders at the bottom of the recesses in the end covers will abut as shown on the drawings and form a vapor-proof seal between said rings and the end covers.

Each of the end covers includes a bearing recess 30 and within which is mounted a bearing 32 that journals the shaft 34 of the rotor. The particular bearings shown are anti-friction bearings and it will be understood that the motor could be of the sleeve bearing type of construction if so desired.

Turning now to Figure 2, the particular configuration of the stator iron will be seen. The laminations forming the stator iron 12 are each formed so as to have four radially extended portions thereon as at 36. The outer peripheries of these projections 36 are formed to conform to the inside of a cylindrical shell member 38 which is pressed over the stator iron after its assembly with the rings 16. Between the projections 36 the stator iron is spaced from the inner periphery of the shell 38 so as to form the arcuate spaces 40 through which cooling air for the motor is to be driven.

Referring to Figures 1 and 2, it will be noted that the end covers 24 comprise spaced upstanding lug parts 42 which are located substantially midway between adjacent of the projections 36 of the stator iron.

It will be observed the length of the shell 38 is such that there is a slight clearance between it at each end and the outwardly projecting lugs 42 on the end covers 24. This insures that the end covers will seat firmly against the ends of the rings 16 when the through bolts 44 are drawn up tight and that the shell 38 will not in any way affect the alignment of the end covers with the stator.

It will be evident from Figures 1, 2, and 3 that the shell 38 and the valleys 40 extending along the stator iron define channels through which air can pass for cooling the motor stator. For driving air through these channels, the motor is provided with a fan 46 which is mounted on the rotor shaft 34 externally of the left-hand end cover 24 in Figure 1. This fan is of any suitable type and may be pressed or cast as the occasion requires.

The end covers at each end are enclosed by a fairly thin sheet metal cover member 48 and which is supported by the outer peripheral portions of the lugs 42 on the end covers. The cover members 48 are retained in position by the screws 50 which pass through apertures in the said cover members and into the lugs 42 of the end covers. Preferably, the cover members 48 are so formed that their edge parts abut the ends of the shell 38 and thereby provide for a better appearance and also prevent the air blown by the fan 46 from leaking out between the cover members and the said ring.

Each of the cover members is centrally apertured as at 52 and there may be mounted within the aperture adjacent the fan 46 a screen member 54 for the purpose of preventing foreign matter from being blown through the motor and also to prevent articles from being introduced to the inside of the cover member which might injure the fan 46 or be injured thereby.

From the foregoing description, it will be evident that I have provided an improved construction suitable for totally enclosed motors or for vapor-proof or explosion-proof motors and which is relatively simple and inexpensive to build and which has the advantages of rigidly aligning and supporting the rotor relative to the stator and of providing a highly efficient vapor seal around the peripheries of the end covers.

Inasmuch as there must be electrical energy supplied to the motor, the construction illustrated in Figure 4 may be utilized for admitting lead in wires to the interior of the stator without breaking the vapor seal thereof. In Figure 4 it will be seen that one of the rings 16 is apertured and that there is welded therein a pipe coupling as at 56. Threaded into this pipe coupling is a pipe nipple 58 and this nipple passes through a suitably sized aperture 60 in the outer shell 38. Threaded onto the outer end of the nipple 58 is a terminal box 62 and electric wires may be led into this terminal box through the rigid conduit 64. The wires for supplying energy to the motor and which are indicated at 66 in Figure 4 pass through the pipe nipple 58 and are sealed therein by means of the sealing compound indicated at 68 which is poured or pressed into the pipe nipple in order to effect a tight vapor seal about the wires therein.

It will be evident that by utilizing the arrangement shown in Figure 4 the bringing of lead wires to the motor, and which may vary in number from two to nine do not in any way influence the vapor seal of the motor.

It will be evident that the particular arrangement shown is not the only form which the instant invention can take without departing from the spirit thereof. For example, while there is shown a single-phase motor having a rotor with a commutator, the invention is equally applicable to a split-phase or to a multi-phase motor as well. Further, while there have been shown anti-friction bearings for supporting the rotor, it will be apparent that sleeve type bearings could be employed without in any way departing from the spirit of the invention. It will also be evident that while I have shown four of the tie bars 18 there could be more or fewer of these as the occasion dictated, and also that the particular shape of the laminations between the radially projecting parts 36 thereof is not critical except that they provide for flow passages for the cooling air driven about the motor by the fan 46.

In connection with motors of the general type shown in the drawings, that is, commutator motors, there is always some slight sparking at the brushes. These sparks are the principal hazard to be guarded against when the motor is used in an explosive location, and it will be apparent that this invention, or any modification that may come within the purview thereof, is well adapted to offset this hazard.

It will be understood that it is desired to comprehend such modifications within this invention as may fall within the scope of the appended claims.

I claim:

1. In an enclosed motor; a laminated stator having circumferentially spaced valleys extending axially along the outer surface thereof, a ring abutting each end of the stator and the same diameter as the bottoms of said valleys, tie bars extending along said valleys and connecting said rings, closed end covers telescoping and abutting the ends of said rings and thus forming a total enclosure for the interior of the motor, a cylindrical shell pressed over the projections between said valleys and forming with the stator and rings axial air passages, cover members abutting the ends of said shell and extending over said end covers and spaced therefrom and being centrally apertured, a fan between one of said end covers and cover members for driving air through said cover members and shell and around said motor along said passages, and lug means outstanding radially from said end covers to support said cover members, there being an axial clearance between the ends of said shell and said lug means whereby said end covers are aligned with said stator wholly by their engagement with the ends of said rings.

2. In a totally enclosed motor; a laminated stator, circumferentially spaced axially extending projections on the outside of said stator, end rings abutting opposite sides of the stator and of smaller radial extent than said projections, tie bars rigidly connecting said rings and extending along the outside of the stator in the valleys between said projections, a cylindrical shell closely fitting over said projections and substantially co-extensive axially with said rings and stator, closed substantially flat end covers telescopically engaging and abutting the ends of said rings and thus forming a total enclosure for the interior of said motor, centrally positioned bearing hubs in said covers substantially radially inwardly of the engagement of said covers and rings, peripheral lugs on said covers and through bolts extending along the valleys between the projections on said stator and connecting the lugs on the end covers to clamp the said covers in position against the ends of the rings, there being an axial clearance between said lugs and the ends of the shell, said lugs being formed to a smaller radius than the outside of said shell, dish-shaped cover members fitting over and secured to said lugs and abutting the ends of the shell and registering therewith axially, said members being centrally apertured, and a fan between one of said cover members and the adjacent end cover for moving air into one of the cover members, along the valleys of the stator and out the other cover member.

3. In a totally enclosed motor; a laminated stator having circumferentially spaced axially extending projections on the outside, cylindrical end members abutting opposite sides of said stator, axial tie bars integrally joining said end members and extending along the outside of the stator in the valleys between said projections and closely embracing said stator, a cylindrical shell tightly fitting over said projections and substantially co-extensive axially with said stator and end members, closed substantially flat end covers telescoping and abutting the ends of said end members and including spaced peripheral lugs and central bearing hubs, through bolts connecting the lugs on opposite end covers and extending along the said valleys of the stator, there being an axial clearance between said lugs and the ends of said shell, centrally apertured dish-shaped cover members mounted about the end covers and having axial peripheral edge parts fitting over and secured to said lugs and abutting the ends of said shell, a rotor in said stator having a shaft journalled in the said hubs in said end covers and extending therethrough, and a fan on said shaft between one of said end covers and cover members to circulate air around said motor.

4. In a totally enclosed motor; a laminated stator having circumferentially spaced valleys extending axially along the outer surface thereof, an end ring abutting each end of the stator, said end rings being externally shouldered at their outer ends, tie bars extending along said valleys and rigidly connecting said rings, closed internally shouldered end covers telescoping the ends of said rings with said shoulders abutting to form a vapor-proof enclosure for the interior of the motor, said stator having windings thereon and said rings extending to beyond the outer limits of said windings, said end covers being substantially flat and having centrally located bearing hubs, a cylindrical shell pressed over the projections of said stator that project between said valleys and forming with the stator axial air passages, cover members abutting the ends of said shell and extending around over said end covers and being centrally apertured, spaced peripheral lugs on said end covers, and through bolts extending through said lugs and clamping said end covers against said rings, there being axial clearance between said lugs and shell, and means supporting said cover members on said lugs.

5. In a totally enclosed motor; a laminated stator, circumferentially spaced valleys of substantially uniform depth extending axially along the outside of said stator, said stator having windings thereon, end rings abutting opposite faces of said stator and extending beyond the outer ends of said windings, tie bars extending along said valleys and rigidly connecting said end rings, a shell pressed over the projections on said stator that extend outwardly between said valleys, thereby defining with said stator spaced air passage means of substantially the same depth, end covers telescoping and abutting the ends of said rings, through bolts clamping said end covers against said rings, cover members supported on said end covers and abutting said shell and being centrally apertured, a fan between one of said end covers and cover members for driving air through said passages for cooling said motor, a rotor in said motor, and means journaling said rotor in said end covers and located substantially radially inwardly from the engagement of said end covers with said ring.

STEFFEN S. BROWN.

REFERENCES CITED

The following references are of record in the file of this patent:

UNITED STATES PATENTS

| Number | Name | Date |
| --- | --- | --- |
| 1,759,415 | Perlesz | May 20, 1930 |
| 1,921,845 | Smith | Aug. 8, 1933 |
| 2,413,525 | Smith | Dec. 31, 1946 |
| 2,449,494 | Ludwig | Sept. 14, 1948 |